G. M. PELTON.
BAND SAW MILL.
APPLICATION FILED NOV. 9, 1911.
1,074,197.
Patented Sept. 30, 1913.
3 SHEETS—SHEET 3.
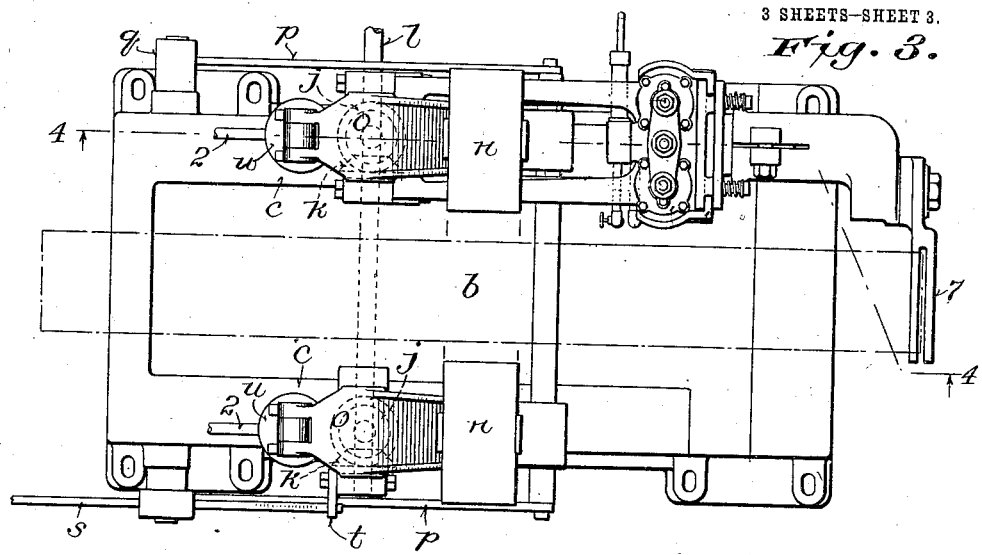
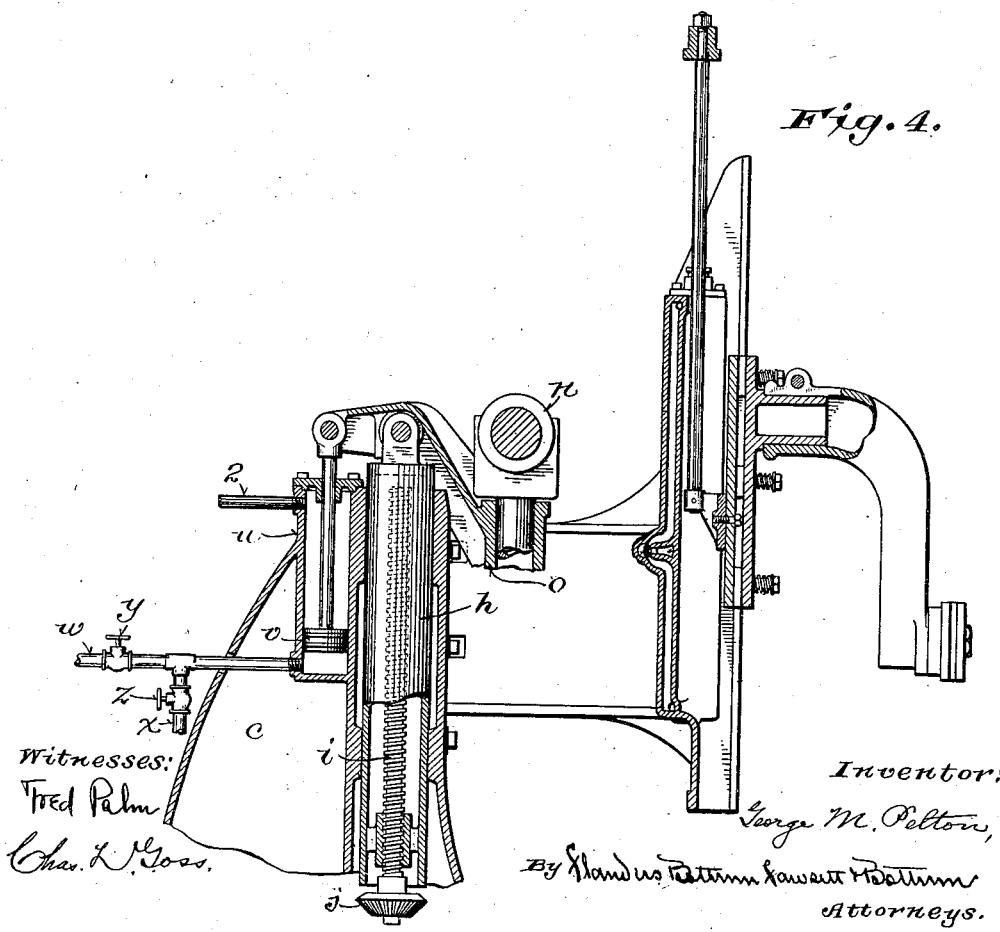

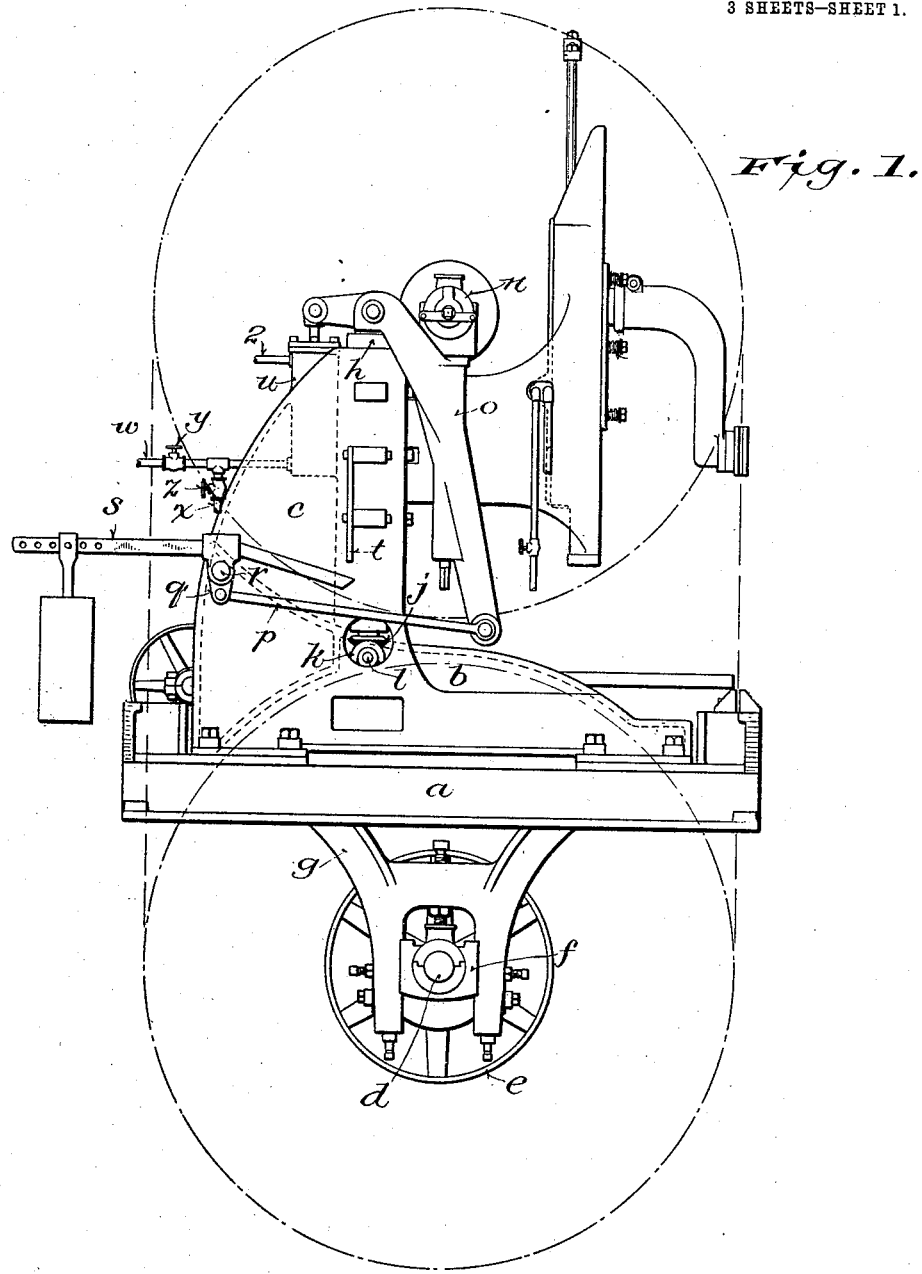

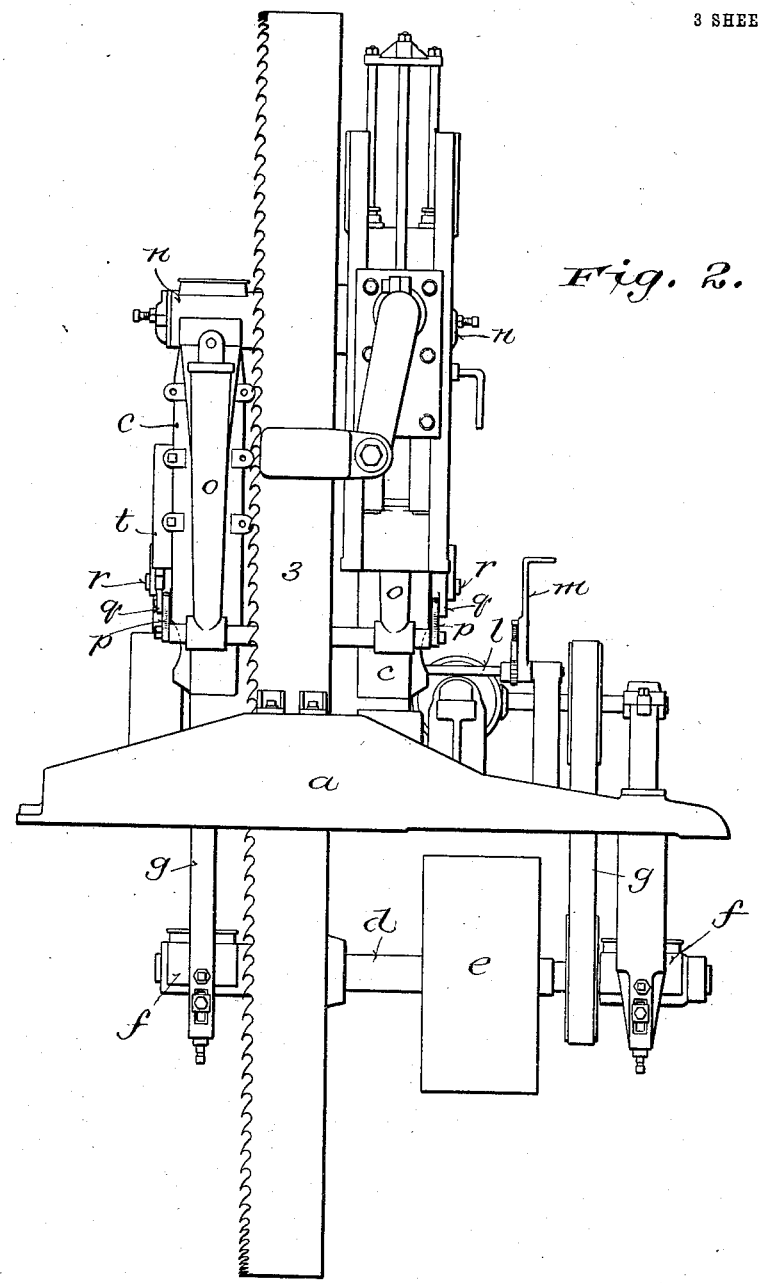

UNITED STATES PATENT OFFICE.

GEORGE M. PELTON, OF MILWAUKEE, WISCONSIN, ASSIGNOR TO THE FILER AND STOWELL COMPANY, OF MILWAUKEE, WISCONSIN, A CORPORATION OF WISCONSIN.

BAND-SAW MILL.

1,074,197. Specification of Letters Patent. Patented Sept. 30, 1913.

Application filed November 9, 1911. Serial No. 659,311.

*To all whom it may concern:*

Be it known that I, GEORGE M. PELTON, a citizen of the United States, residing at Milwaukee, in the county of Milwaukee and State of Wisconsin, have invented certain new and useful Improvements in Band-Saw Mills, of which the following is a specification, reference being had to the accompanying drawing, forming a part thereof.

This invention relates more particularly to means for adjusting the upper band wheel. Its main object is to facilitate such adjustment.

It consists in the construction, arrangement and combinations of parts as hereinafter particularly described and defined in the claims.

In the accompanying drawing like characters designate the same parts in the several figures.

Figure 1 is a side elevation of portions of a band saw mill embodying the invention, the band wheels and saw being indicated by dotted lines; Fig. 2 is a front elevation of the mill; Fig. 3 is an enlarged plan view without the band wheels, saw and frame base; and Fig. 4 is a vertical section on the line 4 4, Fig. 3.

Referring to Figs. 1 and 2 of the drawing, $a$ designates the bed or base of the saw frame, upon which is mounted the housing $b$ for the lower band wheel and standards $c$ for supporting the upper band wheel, the housing and standards being preferably cast together in one piece, as shown. The lower band wheel shaft $d$, which is provided with the driving pulley $e$, is mounted in boxes $f$ carried by hangers $g$ extending downwardly from the bed or base $a$.

In the standards $c$ are fitted and guided parallel with each other, the vertically movable slides $h$ for supporting and raising and lowering the upper band wheel, as shown in Fig. 4. Vertical screws $i$ engaging nuts in the slide $h$, are provided at their lower ends with bearings in the frame or standards $c$ and adjacent to their lower ends with bevel gears $j$ which mesh with similar gears $k$ on a horizontal connecting shaft $l$, as shown in Figs. 1, 3 and 4. As shown in Fig. 2, the shaft $l$ is provided with a crank $m$ for turning it by hand and thereby raising and lowering the upper band wheel.

Boxes or bearings $n$ for the upper band wheel shaft are adjustably mounted on elbow-shaped levers $o$ which are fulcrumed or pivoted adjacent to their elbows on the upper ends of the slides $h$. The longer depending arms of these levers are connected by links $p$ with arms $q$ on a transverse rocker shaft $r$, which is provided with an adjustably weighted arm $s$ for yieldingly supporting the upper band wheel and subjecting the saw to the requisite tension.

The arm $s$ is extended on the opposite side of the shaft $r$ from its weight, as shown in Fig. 1, to coöperate with a stop $t$ and thus limit the downward movement of the weight, when the slides $h$ are lowered to a certain extent.

In removing and replacing saws, the upper band wheel, indicated by the upper broken line circle in Fig. 1, is lowered and raised by means of the screws which are operated by turning the crank shaft $l$ by hand. With large heavy band mills this is a laborious operation, and in order to facilitate the raising, lowering and vertical adjustment of the upper band wheel for this purpose, the mill is provided with the following mechanism: Each of the standards $c$ is formed or provided adjacent to its upper end with a cylinder $u$, parallel with the slide $h$ and having a piston $v$ which is connected by its upwardly extending rod with the shorter arm of the associated lever $o$. Supply and exhaust pipes $w$ and $x$ provided with valves $y$ and $z$, as shown in Figs. 1 and 4, are connected with the lower end of each cylinder $u$ for admitting steam, compressed air or other fluid medium under pressure to said cylinder and releasing the same therefrom. A waste pipe 2 leads from the upper end of each cylinder for conducting off any water which may be formed by condensation, or leak into said cylinder above its piston. The pistons $v$ are made of such an area that with a given pressure they will sustain the upper band wheel with its bearings $n$ and the levers $o$.

To lower the upper band wheel for removing a saw, the weight on the lever $s$ is blocked up so as to take the tension off the saw when the wheel is lowered, steam or other fluid under pressure is admitted to the lower ends of the cylinders $u$ by opening the valves $y$ in the pipes $w$, the valves $z$ in the exhaust pipes $x$ being closed. The pressure of the fluid medium exerted on the lower ends of the pistons $v$ takes the weight of the upper band wheel with its bearings $n$ and the levers $o$, off from the screws $i$, so that they can be turned with little or no friction in the slides $h$. The shaft $l$ is then turned by means of the crank $m$ so as to run the slides $h$ down on the screws $i$ and lower the upper band wheel sufficiently to permit of easily removing the saw therefrom, the lower ends of the levers $o$ being guided in their descent by the links $p$ and pivoting on the rocker arms $q$, which are held stationary by the blocked up weight on lever $s$.

When a saw has been placed in position on the band wheels, steam or other fluid under pressure is admitted to the cylinders $u$ as above explained, and the shaft $l$ is turned so as to run the slides $h$ up on the screws $i$ and thereby lift the upper band wheel into operative position, in which the lever $s$ will stand in an approximately horizontal position when its weight is unblocked or released so as to place the saw under tension. The valves $y$ are then closed and the valves $z$ are opened, permitting the steam or other pressure fluid to escape from the cylinders $u$ and the pistons $v$ to move freely therein subject to the action of the weight on the lever $s$ through its connections with the bearings $n$ in maintaining the required tension on the saw 3, shown by full lines in Fig. 2 and indicated by broken lines in Fig. 1.

Various modification in the details of construction and arrangement of parts may be made without departure from the principle and scope of the invention.

I claim:

1. In a band saw mill the combination with vertically adjustable bearings for the upper band wheel and screws for raising and lowering said bearings, of cylinders provided with pistons connected with and adapted to exert an upward pressure against said bearings.

2. In a band saw mill the combination with a frame provided with standards, vertically adjustable slides guided in said standards parallel with each other, connected screws engaging with and adapted to simultaneously raise and lower said slides, levers pivoted to said slides and bearings for the upper band wheel mounted on said levers, of cylinders provided with valve controlled fluid pressure supply and exhaust connections and pistons fitted in said cylinders and connected with said levers so as to exert an upward pressure against the same and the bearings mounted thereon when the pressure medium is admitted to the cylinders.

3. In a band saw mill the combination with a frame provided with standards, vertically movable slides fitted and guided parallel with each other in said standards, levers pivoted to the upper ends of the slides, bearings for the upper band wheel mounted on said levers, connected adjusting screws adapted to simultaneously raise and lower said slides, and a weighted lever connected with said bearing supporting levers and adapted to subject the saw to tension, of cylinders mounted on the standards parallel with said slides and having valve controlled fluid pressure supply and exhaust connections and pistons fitted in said cylinders and connected with said bearing supporting levers and adapted to exert an upward pressure against them when the fluid pressure medium is admitted to the cylinders below the pistons.

4. In a band saw mill the combination with a vertically adjustable bearing for the upper band wheel and a screw for raising and lowering said bearing, of a cylinder provided with a piston connected with said bearing and adapted to relieve the screw from the weight to which it is subjected through said bearing.

5. In a band saw mill the combination with a supporting lever provided with a bearing for the upper band wheel, a screw on which said lever is fulcrumed and supported for raising and lowering said bearing, and a weighted tension lever connected by a link with said supporting lever, of a cylinder provided with a piston connected with said supporting lever and adapted to relieve said screw from the weight to which it is subjected through said supporting lever, the link connection with the tension lever serving to hold the supporting lever in proper position during its vertical movement by said screw when relieved of the weight of the upper band wheel by said piston.

In witness whereof I hereto affix my signature in presence of two witnesses.

GEORGE M. PELTON.

Witnesses:
CHAS. L. GOSS,
FRED PALM.